June 11, 1963    H. B. BROOKS ET AL    3,093,794
AVERAGE-RESPONDING METER
Filed Dec. 24, 1958
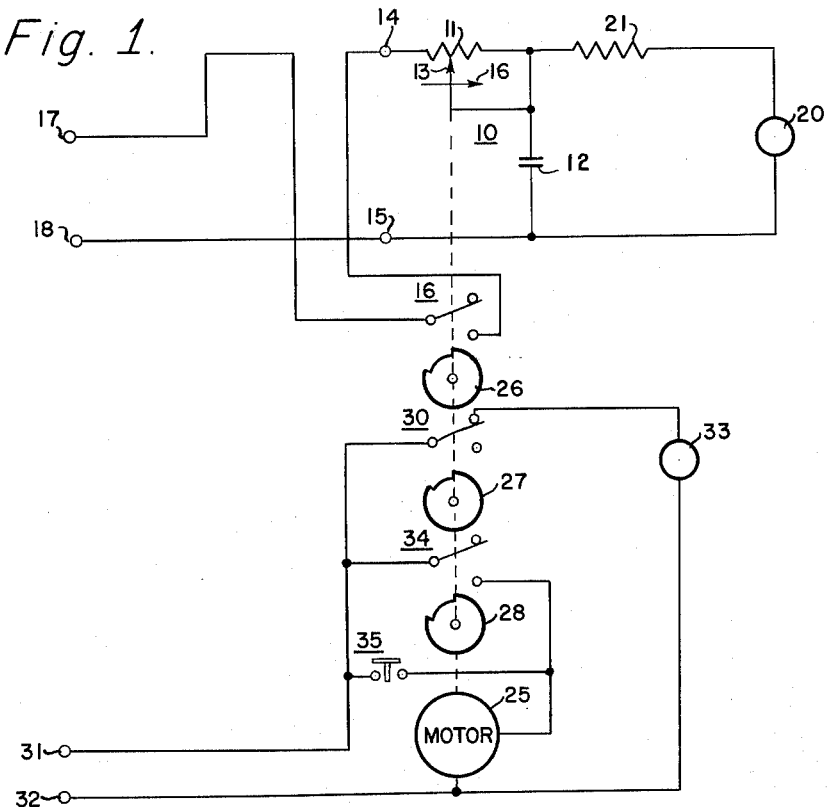
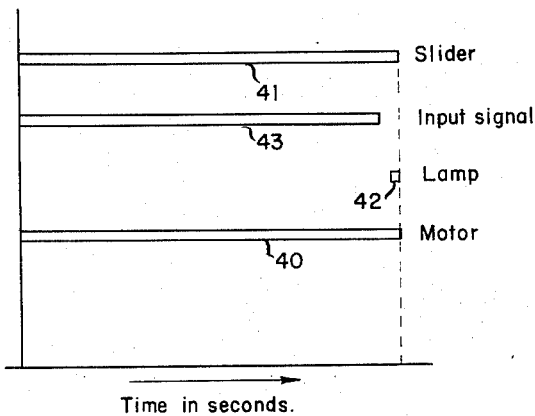
Time in seconds.
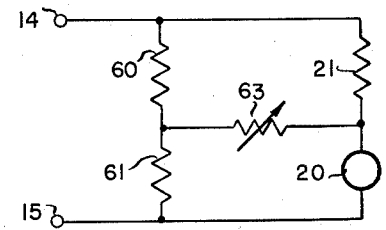
Herbert B. Brooks,
Kenneth E. Walker,
*INVENTORS.*
BY.
*Noel B. Hammond*
AGENT.

United States Patent Office 3,093,794
Patented June 11, 1963

3,093,794
AVERAGE-RESPONDING METER
Herbert B. Brooks, Menlo Park, and Kenneth E. Walker, Poway, Calif.; said Walker assignor to said Herbert B. Brooks
Filed Dec. 24, 1958, Ser. No. 782,954
3 Claims. (Cl. 324—111)

The present invention relates to filters for smoothing signals, and more particularly, to a filter for providing an output signal indicative of the true average amplitude of a fluctuating signal over a time interval of predetermined length.

In measuring the amplitude of fluctuating electrical signals it is common to employ a simple low-pass resistance-capacitance filter in series between the meter and the source of the electrical signals to smooth out the amplitude fluctuations. Such an arrangement does not indicate the true average value of a varying voltage or current over a time interval because it tends to respond to later instantaneous amplitudes in a greater proportion than to earlier occurring instantaneous amplitudes. In other words, it weights the values of later-occurring instantaneous amplitudes more heavily than earlier-occurring instantaneous amplitudes.

One method of correcting this deficiency to some extent is to increase the time-constant of the low-pass filter greatly to reduce the difference in the weighting of earlier and later signals. This circuit is then called an integrator. However, this arrangement merely approaches the measurement of the true average value over a time interval and is in error by a factor of $RC/t$, where R is the resistance of the resistor, C is the capacitance of the capacitor and $t$ is the length of the time interval.

Accordingly, it is an object of the present invention to provide a filter which develops an output signal indicative of the true average value of a fluctuating signal over a time interval.

It is another object of the invention to provide an arrangement for averaging a varying signal over a time interval by giving equal weight to each instantaneous signal amplitude occurring during the interval.

It is a further object of the present invention to provide an arrangement for responding to a signal ($E_{in}$) over a period of time ($t$) in a manner such as to develop an output signal which is equal to $$\frac{1}{t}\int E_{in}\,dt$$

In accordance with the present invention, a filter is provided which has a variable filtering time-constant. The filtering time-constant is continuously varied throughout the time interval over which it is desired to average a fluctuating signal. It is a feature of the invention that the filtering time-constant of the filter is maintained equal to the elapsed time at all times during the interval. Another feature of the invention is that an embodiment in accordance therewith may employ either electrical or mechanical filtering action. An exemplary circuit for electrical filtering utilizes a resistance-capacitance filtering circuit connected in series between a meter and the source of an electrical signal to be measured. A motor varies the value of the resistance to maintain the product of the resistance and capacitance always equal to the elapsed time. In a second exemplary embodiment employing mechanical filtering, the damping action of a meter movement is employed as the equivalent of an electrical filter. A motor varies a resistor which controls the shunting of the meter movement, and thereby the damping, to maintain the filtering time-constant equal to the elapsed time.

For a better understanding of the invention, together with other and further objects thereof, reference may be made to the following description taken in connection with the accompanying drawing in which embodiments of the invention are illustrated by way of example only, like reference characters designating like parts throughout the figures thereof, and wherein:

FIG. 1 is a circuit diagram of an average-responding meter embodying the present invention;

FIG. 2 is a diagram of a circuit which may be substituted for a portion of the circuit of FIG. 1 to produce a second embodiment of an average-responding meter in accordance with the invention; and FIG. 3 is a time-sequence chart illustrating the mode of operation of the average-responding meter of FIGS. 1 and 2.

Referring now to FIG. 1, there is illustrated an electrical filtering circuit, indicated generally at 10, having a variable time-constant. The filtering circuit 10 comprises a variable resistor 11 and a capacitor 12. The resistor 11 is provided with a slider 13 which is connected to the right hand terminal of the resistor 11 and to which one side of the capacitor 12 is connected. A terminal 15 at the other side of the capacitor 12 and the left hand terminal 14 of the resistor 11 may be considered to be the input terminals of the filtering circuit 10. In response to a signal applied at these terminals 14 and 15, a filtered output signal will appear across the capacitor 12.

The filtering time-constant is equal to the product of the resistance from the left hand terminal 14 to the slider 13 of the resistor 11, times the capacitance of the capacitor 12. It will be understood that the time-constant of the filtering circuit 10, as defined here, assumes that the output terminals of the filtering circuit 10 are open-circuited. It will be apparent that the time-constant of the filtering circuit 10 will be increased as the slider 13 of the resistor 11 is moved to the right, as indicated by the arrow 16.

One terminal of a cam-actuated switch 16 is connected to terminal 14 of the resistor 11 for controlling the application of an input signal to the filtering circuit 10. The other side of the switch 16 is connected to a signal input terminal 17. The other terminal 15 of the filtering circuit 10 at the lower end of the capacitor 12 is connected in a similar manner to a second signal input terminal 18. Thus when switch 16 is closed, an input signal applied to signal input terminals 17 and 18 will appear at the input terminals 14 and 15 of the filtering circuit 10.

A meter 20 is connected across the output terminals of the filtering circuit 10 by means of a series-connected meter calibrating resistor 21. The calibrating resistor 21 is selected or adjusted for proper full-scale reading of the meter 20. The meter 20 is a vacuum tube voltmeter having a relatively high input impedance in order to prevent appreciable loading of the filtering circuit 10 and consequent change of the filtering time-constant.

The slider 13 of the filtering resistor 11 is mechanically coupled to a motor 25 for variation of the time-constant of the filtering circuit 10 linearly with elapsed time. In addition, the motor 25 drives three cams 26, 27 and 28. Cam 26 operates the signal switch 16. Cam 27 operates a switch 30 which applies a potential from terminals 13 and 32 to an indicator light 33 which indicates when the meter 20 may be read. Cam 28 operates a switch 34 which controls the operation of the motor 25.

In order to initiate the operation of the average-responding meter, a push button switch 35 connected in parallel with the motor controlling switch 34 is momentarily closed. The motor 25 then begins to rotate and cam 28 closes the motor controlling switch 34 which permits the motor 25 to continue to rotate even after the push button switch 35 is released.

In FIG. 3, the sequence of operation of the average-responding meter is illustrated. A signal to be measured is first connected to the signal input terminals 17 and 18 and an operating potential is applied at terminals 31 and 32. The filtering capacitor 12 is first discharged by temporarily shorting the input terminals 17 and 18. This could be accomplished by an additional cam-operated switch, if desired. The push button switch 35 is then momentarily closed and the motor 25 then begins to rotate, as indicated by time sequence bar 40 of FIG. 3, which also causes the slider 13 of resistor 11 to move, as indicated by bar 41. Cam 26 closes switch 16 to apply the signal at terminals 17 and 18 to the terminals 14 and 15 of the filtering circuit, as indicated by bar 43. Cam 27 holds switch 30 open to maintain the read lamp 33 in the off condition, as indicated by bar 42 of FIG. 3. The time-constant of the filtering circuit 10 is maintained equal to the time elapsed from the beginning of the operation, by the movement of the slider 13 across the resistor 11.

With a fluctuating input signal, the pointer of the meter 20 will at first fluctuate greatly, and as the time-constant increases, will gradually approach a steady reading. Before the slider 13 of the resistor 11 has reached the end of its travel, switch 16 is opened to remove the input signal from the filtering circuit 10, by cam 26. This action is indicated at the righthand end of bar 43 of FIG. 3. The cam 27 closes switch 30 to cause the read lamp 33 to be illuminated, (bar 42) and cam 28 opens switch 34 to cause the motor 25 to stop turning (righthand end of bar 40). At this time, the meter 20 will indicate the true average value of the input signal for the time interval, and may be read.

By maintaining the filtering time constant (RC) equal to the elapsed time ($t$), the equation for the response of a simple low-pass filter is modified to become $$E_{out} = \frac{1}{t}\left[\int E_{in} dt + K\right]$$

By starting the time-constant (RC) equal to zero at the beginning of the averaging period when the elapsed time ($t$) is equal to zero and by insuring that the capacitor 12 starts with no initial charge, the constant K is made to equal zero. Thus, the output signal of the programmed averaging filter of the present invention is equal to $$\frac{1}{t}\int E_{in} dt$$

It should be apparent that, by definition, this is equal to the true average value of an input signal ($E_{in}$) during a specific time interval ($t$).

FIG. 2 illustrates a modification which may be made to the circuit of FIG. 1 for measuring signals at low impedance levels. The filtering circuit 10 of FIG. 1 is disconnected at its input terminals 14 and 15 and the circuit of FIG. 2 is substituted. A pair of resistors 60 and 61 are connected in series across the input signal source. The meter 20 is connected in series with its calibrating resistor 21 across the input signal source also. A variable resistor 63 is connected from the junction of resistors 60 and 61 to the junction of resistor 21 and the meter 20. The ratio of the resistance of resistors 60 and 61 is made equal to the ratio of the resistance of resistor 21 and the meter 20. In this embodiment, the meter 20 is not a vacuum tube voltmeter, but is a sensitive low impedance meter movement of a type which may be overdamped by a ratio of 5 to 1 or more by utilizing external shunting which cooperates with the equivalent reactance elements inherent in the meter movement to provide the effect of an averaging filter. A microammeter movement of the type manufactured by the Weston Instrument Co. has been found to be satisfactory. Resistor 63 is mechanically coupled to the motor 25 for decreasing non-linear variation of the resistance thereby. Variation of resistor 63 changes the damping of the meter 20 and thereby the filtering time-constant of the circuit. The time-constant is maintained equal to the elapsed time.

The maximum time-constant of the filtering circuit 10 and the corresponding duration of the averaging interval should ordinarily be long enough to permit the meter 20 to settle down to a steady indication at the end of the interval for convenience in reading the meter. This will depend on the magnitude of the fluctuations of the signal to be measured. An average-responding meter has been constructed for measuring a signal having peak fluctuations of about plus or minus 10%. The value of the capacitor 12 is 24 microfarads and the value of the resistance 11 is 200,000 ohms. The time interval is adjusted to 4.7 seconds, slightly less than the maximum time-constant of 4.8 seconds, to prevent the slider 13 from reaching the end of its travel before the end of the measuring interval. The true average value of the fluctuating signal is measured to an accuracy of 1% or better by this instrument.

Although the preceding description relates to exemplary circuits for averaging electrical signals, it should be clearly understood that completely mechanical apparatus could be constructed in accordance with features of the present invention for averaging mechanical signals, as in an automobile speedometer.

Thus there has been described a filter for developing an output signal indicative of the true average value of a fluctuating signal over a time interval by giving equal weight to each instantaneous signal amplitude occurring during the interval to develop an output signal which is equal to $$\frac{1}{t}\int E_{in} dt$$

What is claimed is:

1. An average-responding meter comprising first and second input terminals for receiving an applied input signal, a variable resistor having first and second terminals and a slider, a first switch coupled to said first input terminal and the first terminal of said resistor for connecting said first input terminal to the first terminal of said resistor when actuated, a meter having first and second terminals, the second terminal of said resistor being coupled to the slider of said resistor and also to the first terminal of said meter, the second terminal of said meter being connected to said second input terminal, a capacitor having first and second terminals, the first terminal of said capacitor being connected to the slider of said resistor, the second terminal of said capacitor being connected to said second input terminal, a source of potential, an indicator having a terminal connected to said source of potential, a second switch coupled to said source of potential and to another terminal of said indicator for causing said indicator to indicate when said second switch is actuated, a motor having a terminal connected to said source of potential, a third switch coupled to another terminal of said motor and to said source of potential for causing said motor to rotate when said third switch is closed, said motor being mechanically coupled to said switches and the slider of said resistor for successively actuating said first switch when said third switch is closed, moving said slider to maintain the product of the resistance between the first terminal of said resistor and the slider of said resistor and the capacitance of said capacitor substantially equal to the time elapsed since the actuation of said first switch, actuating said second switch and opening said third switch before the slider of said resistor reaches the second terminal of said resistor.

2. An average-responding meter comprising: a meter damping circuit including a pair of input terminals, first and second resistors connected in series across said terminals, a third resistor and a meter movement also connected in series across said terminals, said meter movement being of a type which may be overdamped by a ratio of at least 5 to 1 by means of external shunting cooperating with equivalent reactance elements inherent in said meter movement to provide the effect of an averaging filter, a variable resistor connected from the junction intermediate said first and second resistors to the junction intermediate said third resistor and said meter, said variable resistor having a mechanically movable element for varying the resistance thereof, the ratio of the resistances of said first and second resistors being substantially equal to the ratio of the resistances of said third resistor and said meter, a motor operatively coupled to the variable element of said variable resistor for decreasing nonlinear variation of the resistance thereof to maintain the time constant of said meter damping circuit substantially equal to the time elapsed from the energization of said motor, and means coupled to said motor for energizing said motor when said variable resistor has a predetermined value of resistance.

3. An average-responding meter comprising: first and second input terminals for receiving an applied input signal, a meter damping circuit including series-connected first and second resistors, a third resistor and a meter movement connected in series with each other and in parallel with said series-connected first and second resistors, said meter movement being of a type which may be overdamped by a ratio of at least 5 to 1 by means of external shunting cooperating with equivalent reactance elements inherent in said meter movement to provide the effect of an averaging filter, a variable resistor connected from the junction intermediate said first and second resistors to the junction intermediate said third resistor and said meter, said variable resistor having a mechanically movable element for varying the resistance thereof, the ratio of the resistance of said first and second resistors being substantially equal to the ratio of the resistances of said third resistor and said meter, a first switch coupled to said first input terminal and the end of said first resistor distant from said second resistor for connecting said first input terminal to said first resistor when actuated, the end of said second resistor distant from said first resistor being connected to said second input terminal, a source of potential, an indicator having a terminal connected to said source of potential, a second switch coupled to said source of potential and to another terminal of said indicator for causing said indicator to indicate when said second switch is actuated, a motor having a terminal connected to said source of potential, a third switch coupled to another terminal of said motor and to said source of potential for causing said motor to rotate when said third switch is closed, said motor being mechanically coupled to said switches and the movable element of said variable resistor for successively actuating said first switch when said third switch is closed, varying the resistance of said variable resistor in a decreasing non-linear manner to maintain the time constant of said meter damping circuit substantially equal to the time elapsed since the actuation of said first switch, actuating said second switch and opening said third switch before the movable element of said variable resistor reaches the limit of its travel.

References Cited in the file of this patent

UNITED STATES PATENTS

| | | |
|---|---|---|
| 2,424,312 | Haynes | July 22, 1947 |
| 2,469,383 | Gibbs | May 10, 1949 |
| 2,470,895 | Marlowe | May 24, 1949 |
| 2,508,321 | Wilmotte | May 16, 1950 |
| 2,526,006 | Cress | Oct. 17, 1950 |
| 2,567,688 | Bigelow | Sept. 11, 1951 |
| 2,622,231 | Gray | Dec. 16, 1952 |
| 2,687,474 | Richmond | Aug. 24, 1954 |
| 2,756,376 | Davis | July 24, 1956 |
| 2,774,940 | Bernet | Dec. 18, 1956 |
| 2,941,150 | Richards | June 14, 1960 |